No. 699,717. Patented May 13, 1902.
S. G. SCANLAN.
STERILIZER.
(Application filed July 24, 1901.)

(No Model.) 2 Sheets—Sheet 1.

Witnesses:
Charles L. Herrick
Arthur M. Cox

Inventor
Sam Gwyn Scanlan
By Jesse & H. M. Cox
Attorneys.

No. 699,717. Patented May 13, 1902.
S. G. SCANLAN.
STERILIZER.
(Application filed July 24, 1901.)
(No Model.) 2 Sheets—Sheet 2.

Witnesses:
Charles L. Herrick
Arthur M. Cox

Inventor:
Sam Gwyn Scanlan
By Jesse & H. M. Cox.
Attorneys.

THE NORRIS PETERS CO., PHOTO-LITHO., WASHINGTON, D. C.

UNITED STATES PATENT OFFICE.

SAM GWYN SCANLAN, OF CHICAGO, ILLINOIS.

STERILIZER.

SPECIFICATION forming part of Letters Patent No. 699,717, dated May 13, 1902.

Application filed July 24, 1901. Serial No. 69,528. (No model.)

*To all whom it may concern:*

Be it known that I, SAM GWYN SCANLAN, a citizen of the United States, residing in the city of Chicago, county of Cook, and State of Illinois, have invented a new and useful Improvement in Sterilizers for Surgical Dressings, of which the following is a specification.

My invention relates to sterilizers for purifying surgical dressings and other articles by means of heated air and steam; and, broadly stated, the object of my invention is to provide a sterilizer wherein steam will gain access to the dressings from above and be subsequently dissipated into and mixed with hot air and gases at and below the dressings, thereby preventing the condensation notwithstanding the fact that the steam is at all times at a low pressure.

Another principal object of my invention is to provide means for driving off all moisture from the dressings after sterilization, this being accomplished by permitting the steam to escape without gaining access to the dressings and simultaneously supplying hot air and gases to the dressings directly from the burner beneath.

Other objects of my invention are, first, to provide a sterilizer wherein steam may be generated with great rapidity; second, to provide means whereby the boiler and other parts of the sterilizer may be easily disassembled for cleaning and other purposes; third, to prevent escape and loss of gases arising from the source of heat; fourth, to prevent the escape of steam directly into the air when the sterilizer is closed; fifth, to provide means for regulating the entrance of the steam into the receiving-chamber, and, sixth, to provide the other details hereinafter set forth.

I attain these objects by the mechanism illustrated in the accompanying drawings, in which—

Figure 1:
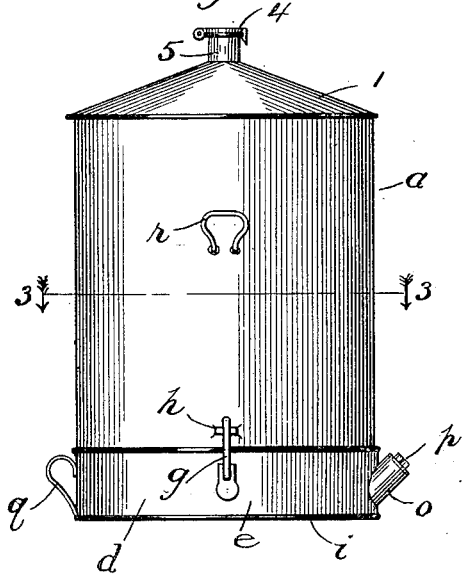
Figure 2:
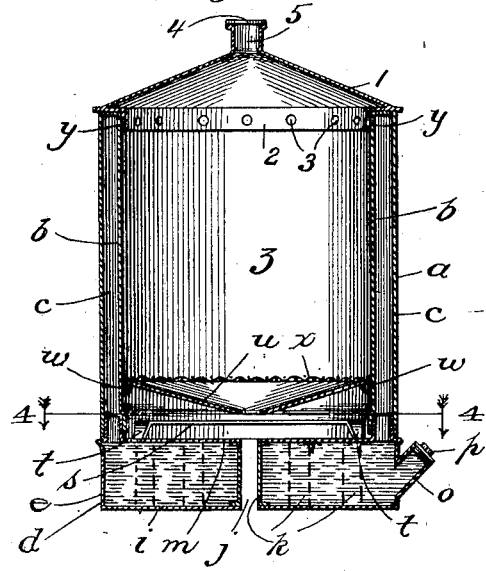
Figure 3:
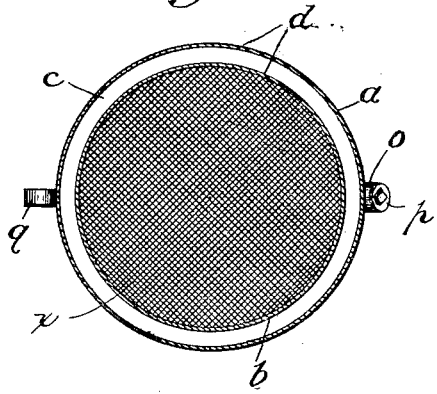
Figure 4:
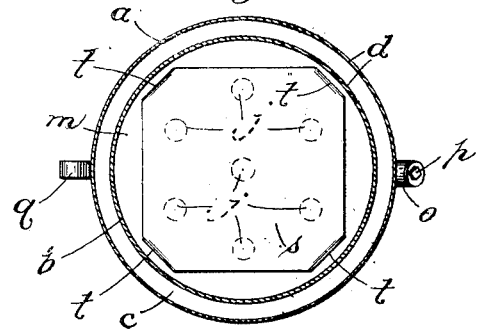
Figure 5:
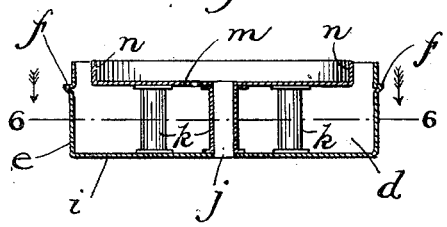
Figure 9:
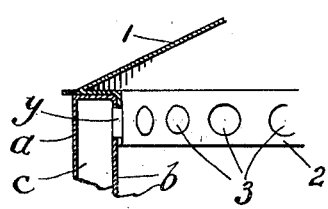
Figure 6:
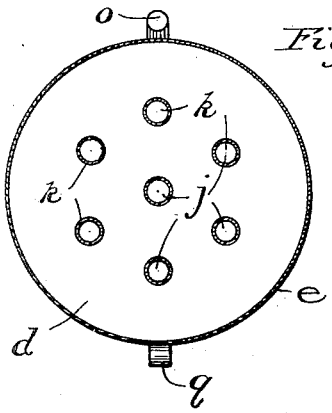
Figure 10:
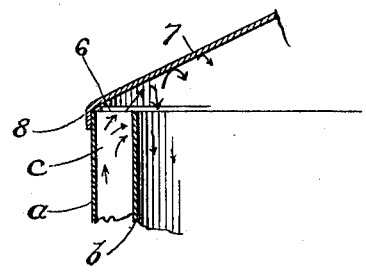
Figure 8:
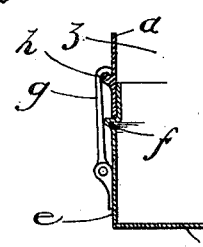
Figure 7:
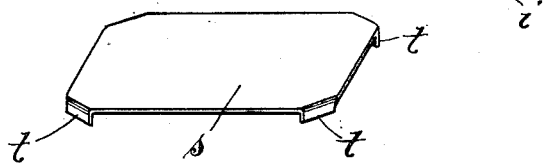

Figure 1 is a side view of the complete device. Fig. 2 is a central vertical section of the device as in Fig. 1. Fig. 3 is a plan view in section taken on the line 3 3, Fig. 1, and showing the screen whereon the dressings are supported. Fig. 4 is a sectional view in plan taken on the line 4 4, Fig. 2, and showing the distributing-plate. Fig. 5 is a central vertical sectional view of the boiler. Fig. 6 is a plan sectional view of the boiler on the line 6 6, Fig. 5. Fig. 7 is a perspective view of the heat-distributing plate. Fig. 8 is a detail view in vertical section, showing the manner of attaching the boiler to the main body of the sterilizer. Fig. 9 is a detail view in central vertical section, illustrating the formation of the damper or regulator. Fig. 10 is a detail view in vertical section, showing an alternative construction of the lid or cover.

Similar characters refer to similar parts throughout the several views.

The sides of the sterilizer are composed of the walls $a$ and $b$, which are preferably cylindrical and are located one within the other in such a manner as to form a passage $c$, extending from top to bottom of the said walls. Said passage is open at its lower extremity and connects with the boiler $d$. Said boiler, which is one of the features of my invention, has an outer wall $e$, adapted to connect with the outer wall $a$ of the sterilizer in such a manner as to be substantially continuous therewith. I prefer to form the connection between said boiler and the outer wall of the sterilizer in the manner best shown in Figs. 5 and 8 of the drawings, the wall $e$ of said boiler having a ledge $f$ formed thereon, which is adapted to support the lower extremity of the said wall $a$, and said walls $a$ and $e$ making telescopic connections one with the other. Said boiler is adapted to be attached in position beneath the sterilizing-receptacle by means of the hooks $g$, pivotally secured to aid boiler and so formed as to engage the lug $h$ upon the wall $a$ near the lower extremity thereof. The bottom $i$ of the boiler is perforated by a series of apertures $j$, connecting with the vertical fire-tubes $k$ $k$. The top of the boiler $m$ forms a false bottom to the sterilizer and has at its periphery an upwardly-turned flange $n$, which fits into the inner wall $b$. Said boiler-top $m$ is perforated to correspond with the perforations $j$ in the bottom $i$ of the boiler, and said tubes $k$ form passage-ways for permitting the gases from the source of heat to pass directly through said boiler. The filler-tube $o$ connects with said boiler from the outside thereof for permitting the introduction of water into the boiler, and said tube is closed by means of the screw-cap $p$.

For convenience in transporting a handle $q$ is attached to the side of the boiler $d$ and handles $r$ are attached to the side walls $a$.

It will be apparent that when the boiler is attached in position beneath the receptacle formed by the walls $a$ and $b$, the boiler is completely closed except where it communicates with the passage $c$ between said walls. The steam therefore cannot escape into the atmosphere, and, moreover, the sterilizer may be transported with the boiler full of water without danger of spilling the water.

The heat-distributing plate $s$ (shown in perspective in Fig. 7) consists of a sheet of metal provided with legs $t\,t$, whereby the plate is supported upon the top $m$ of the boiler, but is raised therefrom a sufficient distance to permit the heating-gases to emerge from the tubes $k$ and pass underneath said plate and finally upward into the receiving-chamber.

The diaphragm $u$ consists of a preferably metallic dished plate having an aperture $v$ therein, forming a passage for the rising gases. Said diaphragm is removably supported upon the lugs $w$, formed upon the inner walls $b$. The screen $x$ rests upon said diaphragm $u$ and forms a false bottom whereon the dressings may lie.

The walls $a$ and $b$ of the receptacle are preferably connected at the top in the manner shown in detail in Fig. 9, whereby the passage $c$ is closed at the top. In this construction a series of apertures $y$ are provided near the upper extremity of the inner wall $b$ for permitting the escape of the steam from said passage to the receiving-chamber $z$ of the receptacle.

The cover 1 rests upon the top of the receptacle and has a depending flange 2, which also has a series of apertures 3, corresponding to said apertures $y$. The two sets of apertures are so arranged that when the cover $i$ is seated upon the receptacle said apertures may in one position of the cover register, but are out of register when the cover is rotated sufficiently in one direction or the other. By this construction the cover forms a regulating-damper for controlling the amount of steam entering into the receiving-chamber $z$. A hinged lid 4 is placed at the top of the cover over the opening 5 therein for controlling the escape of the steam and other vapors.

In operation the parts are assembled as shown in Fig. 2 and the dressings are introduced into the chamber $z$. The heating-gases come directly into contact with the bottom of the boiler and also pass upward through the tubes $k\,k$. A large surface is consequently exposed to the hot gases, and as a result steam is quickly generated with a minimum loss of heat. Steam arising from the boiler, having but one means of escape, passes upward between the walls $a$ and $b$ and finally discharges through the apertures $y$ and 3 into the receiving-chamber $z$, where it comes into contact with the dressings and purifies the same.

The amount of steam entering the chamber is governed by rotating the cover 1, so that the said apertures $y$ and 3 are in or out of register, as desired, and as a further means of regulation the cover may be left open or closed, as conditions may require. Now the hot gases arising from the source of heat, although being spread by the bottom of the boiler, are not deflected away therefrom, and thereby lost, but pass, with small loss, upwardly through the pipes $k\,k$ into the bottom of the main receptacle. The said heating-gases do not, however, come directly into contact with the dressings, as the heat would be too great, but are deflected by the distributing-plate $s$ and after passing upwardly around the edges of said plate are again deflected by the diaphragm $u$. When said gases have finally reached the receiving-chamber $z$ and come into contact with the dressings after having passed through the screen $x$, said gases are so thoroughly commingled that although at a high temperature no harm is done to the dressings. It is obvious that the steam gains access to the dressings from above, thereby affording what is known as "oversteam," while the hot gases entering from below prevent condensation. The present device therefore has the important advantage of having oversteam at low pressure dissipated into and commingled with hot air and gases which pass through an opening in the bottom of the sterilizing-chamber and prevent precipitation of moisture. After the sterilizing process has been completed the lid 4 is thrown back, which allows the steam to escape directly into the air without reaching the dressings. The hot gases still continuing to rise from the bottom of the receptacle through the diaphragm drive off the remaining steam and gases from the chamber.

I desire to direct attention particularly to the fact that the heating-gases themselves enter the receptacle, and consequently not only is a high degree of temperature easily maintained, but the steam is reheated at a time when it has suffered the greatest loss of heat. On account of the great heating-surface of the boiler steam is freely and rapidly generated.

In the alternative construction shown in Fig. 10 the inner wall $b$ extends as high as the outer wall $a$, but is not connected with the latter, so that an opening 6 intervenes, thereby affording means for escape of the steam from the passage $c$ into the receiving-chamber $z$. In the last-described construction the cover 7 has a depending flange 8, making air-tight connection with the outer wall $a$.

It is evident that in the last-described construction the receptacle may be square or of any other desired cross-section.

What I claim as new, and desire to secure by Letters Patent, is—

1. A sterilizer comprising a receptacle having double walls inclosing a passage; a boiler completely closed except at its periphery where said boiler communicates with the passage between said walls, and tubes passing through said boiler for the admittance of heated gases into said receptacle.

2. In a sterilizer the combination of a receptacle having double walls inclosing a passage, a boiler closed to the atmosphere and communicating with said passage, a set of tubes extending through said boiler for conducting the heating-gases directly through said boiler without deflection into said receptacle and a distributing-plate within said receptacle for spreading said gases after the latter have been introduced within said receptacle.

3. In a sterilizer, the combination of a receptacle consisting of an inner and an outer vessel inclosing a vertically-arranged passage, said passage having openings at the top thereof connecting with the interior of the inner vessel, a boiler beneath said receptacle, the outer wall of said boiler joining the outer wall of said receptacle to thereby prevent the escape of steam directly from said boiler to the atmosphere, said boiler opening into said vertical passage; a set of boiler-tubes extending through said boiler for conducting the heating-gases directly through said boiler into said receptacle, and means for detachably attaching said boiler to said receptacle.

4. In a sterilizer, the combination of a receptacle having double walls inclosing a passage, a boiler beneath said receptacle communicating with said passage, the outer wall of said boiler joining with the outer wall of said receptacle to thereby prevent the escape of steam from said boiler directly to the atmosphere, a set of tubes extending vertically through said boiler for conducting the heating-gases through the boiler into the lower extremity of the sterilizing-receptacle, a removable distributing-plate above said tubes, and a diaphragm above said plate having an aperture therein for permitting the upward progress of the heating-gases.

5. In a sterilizer, a receptacle having double walls inclosing a passage between them, in combination with a separate boiler detachably attachable to said receptacle, said boiler being completely closed except at portions communicating with the passage between said walls, and said boiler having a set of vertically-arranged tubes extending therethrough for conducting the heating-gases directly into the said receptacle.

6. In a sterilizer, a pair of hollow cylinders one within another inclosing a passage, said passage being closed at the top and open at the bottom, a boiler, closed except at the bottom of said passage where said boiler communicates with the lower extremity of said passage, apertures in the inner of said cylinders near the top thereof, a cover having a depending flange fitting next to said inner cylinder and apertures in said depending flange, apertures in said inner cylinder and cover, corresponding and communicating when said cover is in one position but being non-adjacent when said cover is rotated, said cover thereby constituting a damper for regulating the admission of steam to the receiving-chamber.

SAM GWYN SCANLAN.

Witnesses:
J. AVIS BRIGHT,
S. WOLF.